(12) United States Patent
Sheidler et al.

(10) Patent No.: US 7,322,192 B2
(45) Date of Patent: Jan. 29, 2008

(54) EXHAUST GAS RECIRCULATION SYSTEM

(75) Inventors: Alan David Sheidler, Moline, IL (US); Ronnie Franklin Burk, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/207,291

(22) Filed: Aug. 19, 2005

(65) Prior Publication Data

US 2007/0039321 A1   Feb. 22, 2007

(51) Int. Cl.
*F02B 33/44* (2006.01)
*F02M 25/07* (2006.01)

(52) U.S. Cl. .................. 60/605.2; 123/568.11

(58) Field of Classification Search ............... 60/605.2, 60/274, 280; 123/568.11; F02M 25/07
See application file for complete search history.

(56) References Cited

U.S. PATENT DOCUMENTS

| | | | |
|---|---|---|---|
| 4,094,284 A * | 6/1978 | Gesell .................... | 123/568.11 |
| 6,205,775 B1 * | 3/2001 | Coleman et al. .......... | 60/605.2 |
| 6,216,458 B1 * | 4/2001 | Alger et al. ............... | 60/605.2 |
| 6,453,893 B1 * | 9/2002 | Coleman et al. ............... | 60/274 |
| 6,543,428 B1 * | 4/2003 | Blandino et al. ............. | 60/274 |
| 6,609,374 B2 * | 8/2003 | Feucht et al. ............... | 60/605.2 |
| 2006/0021327 A1 * | 2/2006 | Kiser et al. .................... | 60/280 |

FOREIGN PATENT DOCUMENTS

EP        869275 A1 *  10/1998

* cited by examiner

*Primary Examiner*—Thai-Ba Trieu

(57) ABSTRACT

An internal combustion engine includes an exhaust gas recirculation (EGR) system. The EGR system includes an air-to-gas EGR cooler, an air inlet line communicating cooling inlet air to the EGR cooler, an EGR supply line communicating exhaust to the EGR cooler, a venturi in the exhaust circuit, and an air outlet line communicating heated air from the EGR cooler to the venturi. Flow of exhaust through the venturi draws cooling air through the EGR cooler. The EGR system also includes a turbocharger having an exhaust turbine and an inlet air compressor. A compressor outlet circuit communicates air from the compressor to an engine air intake. A valve is located in the compressor outlet circuit. An EGR venturi in the compressor outlet circuit is connected in parallel with the valve. A cooled EGR line communicates cooled exhaust from the EGR cooler to a suction port of the EGR venturi.

7 Claims, 1 Drawing Sheet

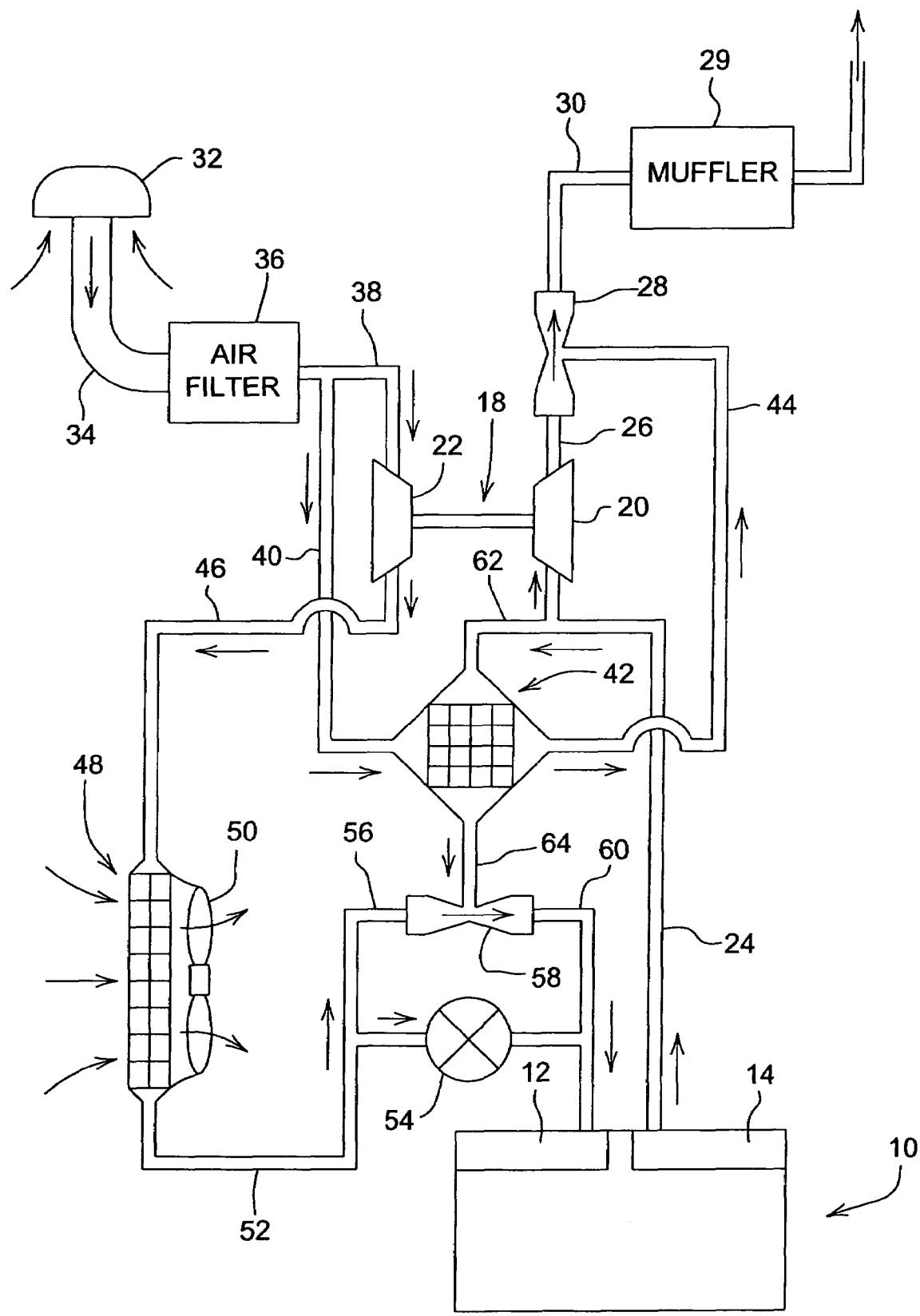

EXHAUST GAS RECIRCULATION SYSTEM

BACKGROUND

The present invention relates to an exhaust gas recirculation system for an internal combustion engine.

It is known that exhaust gas re-circulation (EGR) reduces engine exhaust emissions, especially NO-x. Since exhaust gases are very hot, it may be necessary to provide an EGR cooler to reduce the temperature of the recirculated exhaust gases. It is necessary to reject the heat load which results from such a cooler. The EGR cooler could be cooled by the cooling water which circulates in the engine block. However, this would increase the temperature of the engine and would require a much larger radiator.

SUMMARY

Accordingly, an object of this invention is to provide an engine EGR system which cools the EGR without increasing the temperature of the engine. This and other objects are achieved by the present invention, wherein an exhaust gas recirculation (EGR) system is provided for an internal combustion engine having a combustion air intake circuit and an exhaust circuit for communicating engine exhaust to the environment. The EGR system includes an air-to-gas EGR cooler, an air inlet line communicating cooling inlet air to the EGR cooler, an EGR supply line communicating exhaust from the exhaust circuit to the EGR cooler, a venturi unit in the exhaust circuit, and an air outlet line communicating heated air from the EGR cooler to the venturi unit. Flow of exhaust through the venturi creates a pressure which draws cooling air through the EGR cooler. The EGR system also includes a turbocharger unit having an exhaust turbine and an inlet air compressor. A compressor outlet circuit communicates air from the compressor to an air intake of the engine. A valve is located in the compressor outlet circuit. An EGR venturi is in the compressor outlet circuit and is connected in parallel with the valve. A cooled EGR line communicates cooled exhaust gas from the EGR cooler to a suction port of the EGR venturi.

BRIEF DESCRIPTION OF THE DRAWINGS

The sole FIGURE is a simplified schematic diagram of an EGR system according to the present invention.

DETAILED DESCRIPTION

Referring to the FIGURE, an engine 10 includes a combustion air intake 12, an exhaust outlet 14 and a conventional turbo-compressor 18 which includes a turbine 20 and a compressor 22. An exhaust line 24 communicates engine exhaust from exhaust outlet 14 to the turbine 20. Exhaust line 26 communicates exhaust from turbine 20 to an exhaust venturi 28. Exhaust outlet line 30 communicates exhaust from venturi 28 to the environment through a muffler 29.

An air intake 32 and line 34 provides intake air to air filter 36. Main intake air line 38 communicates air to the compressor 22. Air line 40 communicates a portion (preferably 10%) of intake air to an air inlet of an EGR cooler 42. Line 44 communicates cooling air from EGR cooler 42 to an suction port in the venturi 28.

Line 46 communicates intake air from compressor 22 to a charge air cooler 48, which is cooled by air blown by fan 50. Line 52 communicates cooled charge air from charge air cooler 48 to the engine air intake 12 via a control valve 54.

Branch line 56 communicates line 52 to an inlet of an EGR venturi 58. Branch line 60 communicates an outlet of EGR venturi 58 back to line 52 on the other side of valve 54.

An EGR line 62 communicates a portion of the exhaust from exhaust line 24 to an inlet of EGR cooler 42. Preferably, the EGR line 62 is communicated with the exhaust circuit upstream of the venturi 28 and upstream of the turbine 20. Line 64 communicates cooled EGR from EGR cooler 42 to a suction port of venturi 58.

Thus, in addition to the charge air cooler, there is a second air-to-air type cooler to cool the hot recirculated exhaust gases. This completely separates the EGR cooling function from the engine block cooling system. The EGR cooler can be small due to the large temperature difference between the hot exhaust gas and the cooling air, and the EGR is cooled without increasing the size of the radiator.

While the present invention has been described in conjunction with a specific embodiment, many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An exhaust gas recirculation (EGR) system for an internal combustion engine having a combustion air intake circuit including an air filter, an exhaust circuit for communicating engine exhaust to the environment and a turbocharger unit having an exhaust turbine and an inlet air compressor, the air compressor being connected to the air filter by a compressor inlet line, the EGR system comprising:
an air-to-gas EGR cooler;
an EGR air inlet line communicating cooling inlet air directly from the air filter to the EGR cooler, the EGR air inlet line being connected to the compressor inlet line upstream of the compressor and downstream of the air filter;
an EGR supply line communicating exhaust from the exhaust circuit to the EGR cooler;
a venturi unit in the exhaust circuit; and
an air outlet line communicating heated air from the EGR cooler to the venturi unit, flow of exhaust through the venturi creating a pressure which draws cooling air through the EGR cooler.

2. The EGR system of claim 1, further comprising:
a compressor outlet circuit communicating air from the compressor to an air intake of the engine;
a valve in the compressor outlet circuit;
an EGR venturi in the compressor outlet circuit connected in parallel with the valve; and
a cooled EGR line communicating cooled exhaust gas from the EGR cooler to a suction port of the EGR venturi.

3. The EGR system of claim 1, further comprising:
a charge air cooler having an inlet receiving compressed air from the compressor and having an outlet communicating cooled charge air to the EGR venturi and to the valve.

4. The EGR system of claim 1, wherein:
the EGR supply line is communicated with the exhaust circuit upstream of the venturi.

5. The EGR system of claim 1, wherein:
the EGR supply line is communicated with the exhaust circuit upstream of the turbo-compressor.

6. The EGR system of claim 1, further comprising:
a valve for controlling flow of EGR through the EGR cooler.

7. The EGR system of claim 1, further comprising:
a charge air cooler between the compressor and an engine air intake.

* * * * *